United States Patent [19]

Patton et al.

[11] Patent Number: 5,543,480
[45] Date of Patent: Aug. 6, 1996

[54] POLYMERIZATION PROCESS USING DIENE CONTAINING CATALYSTS

[75] Inventors: Jasson T. Patton; David D. Devore; Francis J. Timmers; Jorge Soto; Gregory F. Schmidt; David R. Wilson, all of Midland, Mich.

[73] Assignee: The Dow Chemical Company, Midland, Mich.

[21] Appl. No.: 267,991

[22] Filed: Jun. 28, 1994

[51] Int. Cl.$^6$ ........................................... C08F 4/64
[52] U.S. Cl. .................. 526/126; 506/131; 506/159; 506/160; 506/346; 506/347.1; 502/152
[58] Field of Search ..................................... 526/126, 159, 526/160, 280, 281, 335, 336, 131, 346, 347.1

[56] References Cited

U.S. PATENT DOCUMENTS

| | | | |
|---|---|---|---|
| 3,242,099 | 3/1966 | Manyik et al. | 252/429 |
| 4,774,301 | 9/1988 | Campbell, Jr. et al. | 526/165 |
| 4,808,680 | 2/1989 | Schmidt et al. | 526/160 |
| 5,045,517 | 9/1991 | Campbell, Jr. et al. | 502/103 |
| 5,064,802 | 11/1991 | Stevens et al. | 502/155 |
| 5,064,918 | 11/1991 | Malanga | 526/77 |
| 5,153,157 | 10/1992 | Hlatky et al. | 502/117 |
| 5,198,401 | 3/1993 | Turner et al. | 502/155 |

FOREIGN PATENT DOCUMENTS

| | | |
|---|---|---|
| 277003 | 1/1988 | European Pat. Off. . |
| 468651 | 7/1991 | European Pat. Off. . |
| 520732 | 11/1992 | European Pat. Off. . |
| 93/23412 | 11/1993 | WIPO . |

OTHER PUBLICATIONS

Blenkers, J., et al., Organometallics, vol 6, 1987, pp. 459–469.
Yasuda, et al., Organometallics, 1, 388 (1982).
Yasuda, et al. Acc. Chem. Res., 18, 120 (1985).
Erker, et al., Adv. Organomet. Chem., 24, 1 (1985).
Yamamoto et al., Organometallics, 8, 105 (1989).
Blenkers, J., et al., Organometallics, 6, 459 (1987).
Erker et al., Angew Chem., Int., Ed., Eng. 23, 455–456 (1984).
C. Kruger, et al., Organometallics, 4, 215–223 (1985).
G. Stout, et al., X–ray Structure Determination, A Practical Guide, Macmillan Co., p. 430–431 (1968).

Primary Examiner—David W. Wu

[57] ABSTRACT

Compositions comprising Group 4 metal complexes containing a diene moiety and activating cocatalysts are used as catalysts for polymerizing olefins, diolefins and/or acetylenically unsaturated monomers. Vinylidene aromatic monomers, particularly styrene are polymerized to form highly syndiotactic polymers.

14 Claims, 1 Drawing Sheet

Fig. 1

POLYMERIZATION PROCESS USING DIENE CONTAINING CATALYSTS

BACKGROUND OF THE INVENTION

This invention relates to certain catalysts useful for preparing polyolefins, especially syndiotactic polyolefins, comprising certain Group 4 metal complexes in combination with one or more activating cocatalysts. More particularly, the metal of such complexes is covalently bonded to a cyclic group with a delocalized n-system (which optionally may be substituted as explained hereinafter) and also bonded to a $C_4$-40 conjugated or nonconjugated diene. Included are such complexes wherein the metal is in the +2 or +4 formal oxidation state. The invention further relates to addition polymerization processes using such complexes.

The preparation and characterization of certain biscyclopentadienyl zirconium and hafnium diene complexes are described in the following references: Yasuda, et al., *Oranometallics*, 1,388 (1982), (Yasuda I); Yasuda, et al. *Acc. Chem. Res.*, 18, 120 (1985), (Yasuda II); Erker, et al., *Adv. Oranomet. Chem.*, 24, 1 (1985)(Erker, et al. (I)); and U.S. Pat. No. 5,198,401. The latter reference describes the use of biscyclopentadienyl zirconium diene complexes as olefin polymerization catalysts in combination with ammonium borate cocatalysts.

The preparation of certain Ti, Zr, and Hf monocyclopentadienyl diene complexes was described in Yamamoto et al., *Oranometallics*, 18, 120 (1989) (Yamamoto) and Blenkers, J, et al., *Oranometallics*, 24, 459 (1987) (Blenkers). Only the Hf complexes disclosed in the latter reference were described as having utility as catalyst components.

Biscyclopentadienyl titanium complexes in which the titanium is in the +4 oxidation state, and olefin polymerization catalysts formed from such by combination with an activating agent, e.g., alumoxane or ammonium borate, are well known in the art. Thus, U.S. Pat. No. 3,242,099 describes the formation of olefin polymerization catalysts by the combination of biscyclopentadienyl titanium dihalides with alumoxane. U.S. Pat. No. 5,198,401 discloses tetravalent biscyclopentadienyl titanium complexes, including at col. 9, lines 24–27 diene containing complexes and olefin polymerization catalysts obtained by converting such complexes into cationic form. Particularly preferred catalysts are obtained by the combination of ammonium borate salts with the biscyclopentadienyl titanium complexes.

Titanium and zirconium complexes, including monocyclopentadienyl complexes in which the metal is in the +4 oxidation state, are also known in the art. Examples of the foregoing references include: U.S. Pat. No. 5,064,918, 4,774,301, 5,045,517 and 4,808,680.

In copending application Ser. No. 08/082,197 filed Jun. 24, 1993, now abandoned there are disclosed monocyclopentadienyl complexes having a cyclic structure in which the titanium is in the +2 formal oxidation state. The application also teaches the formation of olefin polymerization catalysts from such complexes by the combination of the complex with activator compounds such as alumoxanes, borate salts and strong Lewis acids. The teachings of all of the foregoing patents, patent applications and publications are hereby incorporated by reference.

The present invention provides novel addition polymerization catalysts which can be employed over a wide range of physical conditions and with a wide range of monomers and combinations of such monomers, thus providing an outstanding opportunity of making polymers having specifically desired properties. In particular the present catalysts have been found to be particularly suited for the preparation of polymers having a high degree of syndiotacticity, most suitably, syndiotactic monovinylidene aromatic polymers have been prepared using the present catalysts.

SUMMARY OF THE INVENTION

According to the present invention there are provided compositions of matter useful as addition polymerization catalysts comprising:

1) at least one metal complex corresponding to the formula:

$$L_mMD_dX_pX'_q$$

wherein:

M is titanium, zirconium or hafnium;

L is an anionic group containing an aromatic π-system through which the group is bound to M;

D is a $C_{4-40}$ conjugated or nonconjugated diene optionally substituted with one or more groups independently selected from hydrocarbyl, silyl, halocarbyl, halohydrocarbyl and combinations thereof, said substituent having up to 20 nonhydrogen atoms;

X is an anionic ligand group having up to 40 atoms exclusive of the class of ligands defined by L;

X' independently each occurrence is a neutral ligating compound having up to 20 atoms, with the proviso that X' is not π-bound to M through an arene group;

d is 1 or 2;

m is 0 or 1;

p is 0, 1, or 2;

q is 0, 1 or 2; and 2) an activating cocatalyst, the molar ratio of 1) to 2) being from 1:10,000 to 100:1, or the reaction product formed by converting 1) to an active catalyst by use of an activating technique.

Additionally according to the present invention there is provided a polymerization process comprising contacting one or more addition polymerizable monomers with a catalyst comprising the above defined composition of matter.

The present catalysts retain high efficiency over a wide range of polymerization conditions. In addition, the complexes are compatible with and may be used in combination with alkylaluminum compounds which may be employed to scavenge monomer impurities without detrimental effect to their catalytic properties. In particular the complexes have been found to be suitable for use in combination with various activating cocatalysts for the preparation of olefin polymers, especially monovinylidene aromatic polymers, that are highly syndiotactic.

The metal complexes used in the present invention may be formed by reacting a metal precursor compound lacking the present diene group and optionally containing one or two leaving groups with a conjugated or nonconjugated diene, optionally in the presence of a reducing agent if the metal, M, is initially in a higher formal oxidation state than desired in the resulting complex. Alternatively, the diene and reducing agent can be contacted followed by addition of the metal precursor compound. Neutral ligating compounds such as phosphines, phosphites, amines, carbon monoxide, or ethers may be present if desired, said compound having up to 20 nonhydrogen atoms. Suitable leaving groups include halide, hydrocarbyloxides, carboxylates and triflate, said group having up to 10 nonhydrogen atoms.

Metal precursor compounds that are useful in forming the present metal complexes are those which have heretofore been employed in the formation of metallocene complexes.

DETAILED DESCRIPTION

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

The diene group, D, preferably does not decompose under reaction conditions used to prepare the complexes used in the invention. Under subsequent polymerization conditions, or in the formation of catalytic derivatives of the present complexes, the diene group, D, may undergo chemical reactions or be replaced by another ligand. The optionally substituted diene may be linear, branched or cyclic.

L groups optionally present in the present complexes include any anionic, aromatic, π-bonding ligand group such as cyclopentadienyl, pyrroyl, cyclooctatetranediyl and substituted derivatives thereof. Suitable substituents include hydrocarbyl, halocarbyl, halohydrocarbyl, silyl, germyl, halo, amino, phosphino, siloxy, hydrocarbyloxy and combinations thereof, said substituent having up to 20 nonhydrogen atoms, or optionally, two such substituents (except cyano or halo) together cause L to have a fused ring structure. Desirably, such L groups contain up to 50 nonhydrogen atoms. Preferred anionic, aromatic, π-bonded ligand groups correspond to the formula:

wherein:
R' in each occurrence is independently selected from the group consisting of hydrogen, hydrocarbyl, silyl, germyl, cyano, halo and combinations thereof said R' having up to 20 non-hydrogen atoms, or adjacent R' groups (when R' is not hydrogen, cyano or halo) together form a hydrocarbdiyl group connected to adjacent positions of the cyclopentadienyl ring. Most preferred L groups are selected from the group consisting of cyclopentadienyl, methylcyclopentadienyl, tetrammethylcyclopentadienyl, pentamethylcyclopentadienyl, t-butylcyclopentadienyl, indenyl, tetramethylindenyl, fluorenyl, tetrahydrofluorenyl and octahydrofluorenyl.

In the metal complexes used in the present invention, the diene ligand group, D, may be π-bound or σ-bound. Nonconjugated diene groups are all π-bound. Conjugated diene D groups may be associated with the metal in either a s-trans configuration (π-bound) or in an s-cis configuration (either π-bound or σ-bound). Such a distinction is readily determined by X-ray crystallography or by NMR spectral characterization according to the techniques of Yasuda I, Yasuda II, and Erker, et al., Supra, as well as the references cited therein. By the term "π-complex" is meant both the donation and back acceptance of electron density by the ligand are accomplished using ligand π-orbitals, i.e., the diene is σ-bound (σ-bound diene). π-Bound diene complexes have a structure which is formally a metallocyclopentene wherein the bonding between the metal and the diene can be described as a divalent 2-butene- 1,4-diyl σ-bonded to a tetravalent metal, optionally containing a single σ-bond involving the σ electrons between internal carbons of the conjugated diene. Such structures are depicted in simplified form without indicating substituents on the diene as structure A and structure B as follows:

A

B

The nomenclature for such σ-bound diene complexes can be either as a metallocyclopentene (referring to the compounds as 2-butene-1,4-diyl compounds) or generically as the parent diene, ie. butadiene. Those of skill in the art will recognize the interchangability of these names. For example, the prior art biscyclopentadienyl zirconium complex containing a σ-bound 2,3-dimethyl-1,4-butadiene group would be named either bis-cyclopentadienyl(2-butene-2,3-dimethyl-1,4-diyl)zirconium or bis-cyclopentadienyl(2,3-dimethyl-1,4butadiene)zirconium.

A suitable method of determining the existence of a π-complex in conjugated diene containing metal complexes is the measurement of metal-carbon atomic spacings for the carbons of the conjugated diene using common X-ray crystal analysis techniques. Measurements of atomic spacings between the metal and C1, C2, C3, C4 (M-C1, M-C2, M-C3, M-C4, respectively) (where C1 and C4 are the terminal carbons of the 4 carbon conjugated diene group and C2 and C3 are the internal carbons of the 4 carbon conjugated diene group) may be made. If the difference between these bond distances, Δd, using the following formula:

$$\Delta d = \left[ \left\{ \frac{(M-C1)+(M-C4)}{2} \right\} - \left\{ \frac{(M-C2)+(M-C3)}{2} \right\} \right]$$

is greater than or equal to −0.15Å, the diene is considered to form a π-complex with M. If Δd is less than −0.15 Å, the diene is considered to form a σ-complex with M.

Examples wherein the above method for determination of π-complexes has been previously applied are found in Erker, et al., Angew. Chem, Int. Ed.. En., 23, 455–456 (1984) (Erker et al. (II)) and Yamamoto, Supra. In the former reference (η$^3$-allyl)(η $^4$-butadiene)(η$^5$-cyclopentadienyl)zirconium was crystallographically characterized. The M-C1 and M-C4 distances were both 2.360 (±0.005) Å. The M-C2 and M-C3 distances were both 2.463 (±0.005), giving a Δd of −0.103Å. In the latter reference (η$^5$-pentamethylcyclopentadienyl)(η$^4$-1,4-diphenyl-1,3-butadiene)titanium chloride was shown to have M-C1 and M-C4 distances of 2.233 (±0.006) Å. The M-C2 and M-C3 distances were both 2.293 (±0.005) Å, giving a Δd of −0.060 Å. Accordingly, this complex contains a π-bound diene and the zirconium is in the +2 formal oxidation state. Erker et al. (II) also disclosed bis(cyclopentadienyl)zirconium (2,3-dimethyl- 1,3-butadiene). In this complex the M-C1 and M-C4 distances were 2.300 Å. The M-C2 and M-C3 distances were both 2.597 Å, giving a Δd of −0.297 Å. Accordingly, this complex contains a σ-bound diene and the zirconium is in the +4 formal oxidation state. In the use of such X-ray crystal analysis techniques at least "good" and preferably "excellent" determination quality as defined by G. Stout et al. *X-ray Structure Determination A Practical Guide*, Macmillan Co., pg 430–431, (1968) is used.

Alternatively, complexes used in the present invention wherein D is a conjugated diene in the form of a π-complex and M is in the +2 formal oxidation state may be identified using nuclear magnetic resonance spectroscopy techniques. The teachings of Erker, et al., supra, C. Krüger, et al. *Organometallics*, 4, 215–223, (1985), and Yasuda I, supra, disclose these well known techniques for distinguishing between π-bound complexes and metallocyclic coordination or σ-bound diene complexes. The teachings of the foregoing references related to π-bound complexes is hereby incorporated by reference.

It is to be understood that when D is a conjugated diene, the present complexes may be formed and utilized as a mixture of π-bound diene complexes and σ-bound diene complexes. Techniques for separation and purification of π-bound diene complexes from mixtures of π-bound diene complexes and σ-bound diene complexes are known in the art and disclosed for example in the previously mentioned Yasuda I, Yasuda II, and Erker, et al. references and may be employed if desired to prepare and isolate the complexes in greater purity.

Inasmuch as the complexes can contain at most one anionic, aromatic, π-bonded group, it follows that D or X, singly or in combination, cannot comprise a cyclopentadienyl group or other anionic, aromatic π-bonded group.

Examples of suitable D moieties include: butadiene, isoprene, 1,3-pentadiene, 1,4-diphenyl-1,3-butadiene; 3-methyl-1,3-pentadiene; 1,4-dibenzyl-1,3-butadiene; 2,4-hexadiene; 1,4-ditolyl-1,3-butadiene; 1,4-bis(trimethylsilyl)-1,3-butadiene, 1,4-diphenyl-1,3-butadiene; and 2,3-dimethylbutadiene, Suitable X groups include both σ-bonded and π-bonded anionic ligands, excluding those of the class defined by L. Examples of X groups include: halide (fluoride, chloride, bromide and iodide, especially chloride), hydrocarbyl, hydrocarbyloxy, silyloxy, carbozylate, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)phosphino-substituted derivatives thereof, said X group having up to 20 nonhydrogen atoms. Preferred X groups are chloride, OR, NR$_2$ (wherein R is C$_{1-10}$ hydrocarbyl), allyl, and pentadienyl groups (including hydrocarbyl substituted allyl- and pentadienyl- groups), said X group having up to 20 nonhydrogen atoms. Especially suited are methoxy, phenoxy, isopropoxy, dimethylamido, allyl and methyl-substituted allyl groups, pentadienyl, and C$_{1-10}$ hydrocarbyl substituted pentadienyl groups, such as 2-methylpentadienyl, 3-methylpentadienyl, 2,4-dimethylpentadienyl, and 6,6-dimethylcyclohexadienyl.

Preferred X' groups are phosphines, especially trimethylphosphine, triethylphosphine, triphenylphosphine and bis(1,2-dimethylphosphino)ethane; phosphites, especially trimethylphosphite, triethyl phosphite and dimethylphenylphosphite; ethers, especially tetrahydrofuran; amines, especially pyridine, bipyridine, tetramethylethylenediamine (TMEDA), and triethylamine; and carbon monoxide.

Preferred coordination complexes used according to the present invention are complexes corresponding to the formula:

wherein:

M and R' are as previously defined;

D is a neutral, η$^4$-bonded, C$_{4-30}$ diene group; and

X is chloride, C$_{1-6}$ hydrocarbyloxide, di(C$_{1-6}$ hydrocarbyl)amide, allyl, methyl substituted allyl, pentadienyl or C$_{1-6}$ hydrocarbyl substituted pentadienyl.

More preferably, R' independently in each occurrence is hydrogen, methyl, ethyl, or an isomer of propyl, butyl, pentyl, and hexyl groups, cyclopentyl, cyclohexyl, norbornyl, benzyl, or phenyl; or adjacent R' groups are linked together thereby forming an indenyl, tetrahydroindenyl, fluorenyl, tetrahydrofluorenyl, or octahydrofluorenyl group; and X is methoxide, isopropoxide, t-butoxide, phenoxide, dimethylamide, allyl, 1-methylallyl, or pentadienyl.

Further preferably, at least one of R' is an electron donating moiety, especially methyl. By the term "electron donating" is meant that the moiety is more electron donating than hydrogen.

The most highly preferred coordination complexes used in the compositions of the present invention are titanium complexes containing one L group wherein L is a cyclopentadienyl moiety or a cyclopentadienyl moiety that is substituted with from 1 to 5 C$_{1-4}$ alkyl radicals.

Examples of the above metal complexes include:

A) amido complexes

A1) cyclopentadienyl complexes including: cyclopentadienyltitanium(1,3-butadiene)dimethylamide; cyclopentadienyltitanium(1,3-isoprene) dimethylamide; cyclopentadienyltitanium2,3-dimethylbutadienedimethylamide; cyclopentadienyltitanium(,1,4-diphenyl-1,3butadiene) dimethylamide; cyclopentadienyltitanium(1,4-dibenzyl-1,3butadiene)dimethylamide; cyclopentadienyltitanium(2,4-hexadiene)dimethylamide; cyclopentadienyltitanium(3-methyl-1,3-pentadiene)dimethylamide; cyclopentadienyltitanium(,1,4-ditolyl- 1,3-butadiene)dimethylamide; cyclopentadienyltitanium(,1,4-bis(trimethylsilyl)-1,3-butadiene)dimethylamide;

A2) pentamethylcyclopentadienyl complexes including: pentamethylcyclopentadienyltitanium(1,3-butadiene)dimethylamide; pentamethylcyclopentadienyltitanium(1,3-isoprene)dimethylamide; pentamethylcyclopentadienyltitanium-2,3-dimethylbutadienedimethylamide; pentamethylcyclopentadienyltitanium(1,4-diphenyl1,3-butadiene)dimethylamide; pentamethylcyclopentadienyltitanium(1,4-dibenzyl1,3-butadiene)dimethylamide; pentamethylcyclopentadienyl-titanium(2,4-hexadiene)dimethylamide; pentamethylcyclopentadienyltitanium(3-methyl-1,3pentadiene)dimethylamide; pentamethylcyclopentadienyltitanium(1,4-ditolyl-1,3-butadiene)dimethylamide; pentamethylcyclopentadienyltitanium(1,4-bis(trimethylsilyl)- 1,3-butadiene)dimethylamide;

A3) t-butylcyclopentadienyl complexes including: t-butylcyclopentadienyltitanium(1,3-butadiene)dimethylamide; t-butylcyclopentadienyltitanium(1,3-isoprene)dimethylamide; t-butylcyclopentadienyltitanium-2,3-dimethylbutadienedimethylamide; t-butylcyclopentadienyltitanium(1,4-diphenyl-1,3-butadiene)dimethylamide; t-butylcyclopentadienyltitanium(1,4-dibenzyl-1,3-butadiene)dimethylamide; t-butylcyclopentadienyltitanium(2,4hexadiene)dimethylamide; t-butylcyclopentadienyltitanium(3-methyl-1,3pentadiene)dimethylamide; t-butylcyclopentadienyltitanium(1,4-ditolyl-1,3butadiene)dimethylamide; t-butylcyclopentadienyltitanium(1,4-bis(trimethylsilyl)-1,3-butadiene)dimethylamide;

A4) indenyl complexes including: indenyltitanium(1,3-butadiene)dimethylamide; indenyltitanium(1,3-isoprene)dimethylamide; indenyltitanium-2,3-dimethylbutadienedimethylamide; indenyltitanium(1,4-diphenyl-l,3butadiene)dimethylamide; indenyltitanium(1,4-dibenzyl-1,3butadiene)dimethylamide; indenyltitanium(2,4-hexadiene)dimethylamide; indenyltitanium(3-methyl-1,3pentadiene)dimethylamide; indenyltitanium(1,4-ditolyl-1,3butadiene)dimethylamide; indenyltitanium(1,4-bis(trimethylsilyl)-1,3butadiene)dimethylamide;

A5) pentadienyl complexes including: pentadienyltitanium(1,3-butadiene)dimethylamide; pentadienyltitaniumisoprenedimethylamide; pentadienyltitanium-2,3-dimethylbutadienedimethylamide; pentadienyltitanium(1,4-diphenyl-1,3butadiene) dimethylamide; pentadienyltitanium(1,4-dibenzyl-1,3-butadiene)dimethylamide; pentadienyltitanium(2,4-hexadiene)dimethylamide; pentadienyltitanium(3-methyl-1,3-pentadiene)dimethylamide; pentadienyltitanium(1,4-ditolyl-1,3-butadiene)dimethylamide; pentadienyltitanium(1,4-bis(trimethylsilyl)-1,3butadiene)dimethylamide;

A6) 2,4-dimethylpentadienyl complexes including: 2,4-dimethylpentadienyltitanium(1,3-butadienedimethylamide; 2,4-dimethylpentadienyltitanium(1,3-isoprenedimethylamide; 2,4-dimethylpentadienyltitanium-2,3-dimethylbutadienedimethylamide; 2,4-dimethylpentadienyltitanium(1,4-diphenyl-1,3-butadiene)dimethylamide; 2,4-dimethyl pentadienyl titanium(1,4-dibenzyl-1,3-butadiene)dimethylamide; 2,4-dimethylpentadienyltitanium(2,4-hexadiene)dimethylamide; 2,4-dimethylpentadienyltitanium(3-methyl-1,3pentadiene)dimethylamide; 2,4-dimethylpentadienyltitanium(1,4-ditolyl-1,3butadiene)dimethylamide; 2,4-dimethylpentadienyltitanium(1,4-bis(trimethylsilyl)-1,3-butadiene)dimethylamide;

A7) 6,6-dimethylcyclohexadienyl complexes including: 6,6-dimethylcyclohexadienyltitanium(1,3-butadiene)dimethylamide; 6,6-dimethylcyclohexadienyltitanium(1,3-isoprene)-dimethylamide; 6,6-dimethylcyclohexadienyltitanium-2,3dimethylbutadienedimethylamide; 6,6-dimethylcyclohexadienyltitanium(1,4-diphenyl1,3-butadiene)dimethylamide; 6,6-dimethylcyclohexadienyltitanium(1,4-dibenzyl1,3-butadiene)dimethylamide; 6,6-dimethylcyclohexadienyltitanium(2,4-hexadiene)dimethylamide; 6,6-dimethylcyclohexadienyltitanium(3-methyl-1,3pentadiene)dimethylamide; 6,6-dimethylcyclohexadienyltitanium( 1,4-ditolyl-1,3-butadiene)dimethylamide; 6,6-dimethylcyclohexadienyltitanium(1,4-bis (trimethylsilyl )-1,3-butadiene)dimethylamide;

AS) 3-methylpentadienyl complexes including: 3-methylpentadienyltitanium(1,3-butadiene-dimethylamide; 3-methylpentadienyltitanium(1,3-isoprene)dimethylamide; 3-methylpentadienyltitanium-2,3-dimethylbutadienedimethylamide; 3methylpentadienyltitanium(1,4-diphenyl-1,3-butadiene)dimethylamide; 3-methylpentadienyltitanium(1,4-dibenzyl-1,3-butadiene)dimethylamide; 3-methylpentadienyltitanium(2,4-hexadiene)dimethylamide; 3-methylpentadienyltitanium(3-methyl-1,3-pentadiene)dimethylamide; 3-methylpentadienyltitanium(1,4-ditolyl-1,3-butadiene)dimethylamide; 3-methylpentadienyltitanium(1,4-bis(trimethylsilyl)- 1,3-butadiene)dimethylamide;

A9) methylcyclopentadienyl complexes including: methylcyclopentadienyltitanium(1,3-butadiene)dimethylamide; methylcyclopentadienyltitanium(1,3-isoprene)dimethylamide; methylcyclopentadienyltitanium-2,3-dimethylbutadienedimethylamide; methylcyclopentadienyltitanium(1,4-diphenyl-1,3-butadiene)dimethylamide; methylcyclopentadienyltitanium(1,4-dibenzyl- 1,3-butadiene)dimethylamide; methylcyclopentadienyltitanium(2,4-hexadiene)dimethylamide; methylcyclopentadienyltitanium(3-methyl-1,3-pentadiene)dimethylamide; methylcyclopentadienyltitanium(1,4-ditolyl-1,3-butadiene)dimethylamide; methylcyclopentadienyltitanium(1,4-bis (trimethylsilyl)-1,3-butadiene)dimethylamide;

A10) tetramethylcyclopentadienyl complexes including: tetramethylcyclopentadienyltitanium(1,3butadiene)dimethylamide; tetramethylcyclopentadienyltitanium(1,3-isoprene)dimethylamide; tetramethylcyclopentadienyltitanium-2,3-dimethylbutadienedimethylamide; tetramethylcyclopentadienyltitanium(1,4-diphenyl1,3-butadiene)dimethylamide; tetramethylmethylcyclopentadienyltitanium(1,4-dibenzyl- 1,3-butadiene)dimethylamide; tetramethylmethylcyclopentadienyltitanium(2,4-hexadiene) dimethylamide; tetramethylmethylcyclopentadienyltitanium(3-methyl- 1,3-pentadiene)dimethylamide; tetramethylmethylcyclopentadienyltitanium(1,4-ditolyl- 1,3-butadiene)dimethylamide; tetramethylmethylcyclopentadienyltitanium(1,4-bis(trimethylsilyl)- 1,3-butadiene)dimethylamide;

A11) tetrahydroindenyl complexes including: tetrahydroindenyltitanium(1,3-butadiene)dimethylamide; tetrahydroindenyltitanium(1,3-isoprenedimethylamide; tetrahydroindenyltitanium-2,3-dimethylbutadienedimethylamide; tetrahydroindenyltitanium(1,4-diphenyl-1,3butadiene)dimethylamide; tetrahydroindenyltitanium(1,4-dibenzyl-1,3-butadiene)dimethylamide; tetrahydroindenyltitanium(2,4-hexadiene)dimethylamide; tetrahydroindenyltitanium(3-methyl-1,3-pentadiene)dimethylamide; tetrahydroindenyltitanium(1,4-ditolyl-1,3-butadiene)dimethylamide; tetrahydroindenyltitanium(1,4-bis (trimethylsilyl)-1,3-butadiene)dimethylamide;

A12) tetrahydrofluorenyl complexes including: tetrahydrofluorenyltitanium(1,3-butadiene)dimethylamide; tetrahydrofluorenyltitanium(1,3-isoprenedimethylamide; tetrahydrofluorenyltitanium-2,3- dimethylbutadiene-dimethylamide; tetrahydrofluorenyltitanium(1,4-diphenyl-1,3-butadiene)dimethylamide; tetrahydrofluorenyltitanium(1,4-dibenzyl-1,3-butadiene)dimethylamide; tetrahydrofluorenyltitanium(2,4-hexadiene)dimethylamide; tetrahydrofluorenyltitanium(3-methyl-1,3-pentadiene)dimethylamide; tetrahydrofluorenyltitanium(1,4-ditolyl-1,3-butadiene)dimethylamide; tetrahydrofluorenyltitanium(1,4-bis(trimethylsilyl)-1,3-butadiene)dimethylamide;

B) hydrocarbyl, silyl or combinations thereof complexes

B1) cyclopentadienyl complexes including: cyclopentadienyltitanium(,4-diphenyl-1,3butadiene)methyl; cyclopentadienyltitanium(,4-dibenzyl- 1,3-butadiene)cyclohexyl; cyclopentadienyl-titanium(2,4-hexadiene)benzyl; cyclopentadienyltitanium(3-methyl-1,3-pentadiene)trimethylsilylmethyl; cyclopentadienyltitanium-(1,4-ditolyl-1,3-butadiene)phenyl; cyclopentadienyltitanium(4-bis(trimethylsilyl)-1,3-butadiene)t-butyl; cyclopentadienyltitanium(1,3-butadiene)allyl; B2) pentamethylcyclopentadienyl complexes including: pentamethylcyclopentadienyltitanium(1,4-diphenyl-1,3-butadiene)methyl; pentamethylcyclopentadienyltitanium(1,4-dibenzyl-1,3-butadiene)cyclohexyl; pentamethylcyclopentadienyltitanium-2,3-dimethylbutadienetrimethylsilyl; pentamethylcyclopentadienyltitanium(2,4-hexadiene)trimethylsilylmethyl; pentamethylcyclopentadienyltitanium(3-methyl-1,3-pentadiene)benzyl; pentamethylcyclopentadienyltitanium (1,4-ditolyl-1,3-butadiene )phenyl; pentamethylcyclopentadienyl titanium(1,4-bis(trimethylsilyl)-1,3-butadiene )t-butyl; pentamethylcyclopentadienyltitanium(1,3-butadiene)allyl;

B3) t-butylcyclopentadienyl complexes including: t-butylcyclopentadienyltitanium(1,4-diphenyl-1,3butadiene)methyl; t-butylcyclopentadienyltitanium(1,4-dibenzyl-1,3-butadiene)cyclohexyl; t-butylcyclopentadienyltitaniumisoprenetrimethylsilyl; t-butylcyclopentadienyltitanium(2,4-hexadiene)trimethylsilylmethyl; t-butylcyclopentadienyltitanium(3-methyl-1,3pentadiene)benzyl; t-butylcyclopentadienyltitanium(1,4-ditolyl-1,3butadiene)phenyl; t-butylcyclopentadienyltitanium(1,4-bis(trimethylsilyl)- 1,3-butadiene)t-butyl; t-butylcyclopentadienyltitanium(1,3-butadiene)allyl;

B4) indenyl complexes including: indenyltitanium(1, 4-diphenyl(1,3-butadiene)methyl; indenyltitanium(1,4-dibenzyl-1,3-butadiene)cyclohexyl; indenyltitanium(1,3-butadiene)trimethylsilyl; indenyltitanium(2,4-hexadiene)trimethylsilylmethyl; indenyltitanium( 3-methyl-1,3-pentadiene)benzyl; indenyltitanium(1,4-ditolyl- 1,3-butadiene)phenyl; indenyltitanium(1,4-bis(trimethylsilyl)-1,3-butadiene)t-butyl; indenyltitanium(2,3-dimethylbutadiene)allyl;

B5) pentadienyl complexes including: pentadienyltitanium(1,4-diphenyl-1,3-butadiene)methyl; pentadienyltitanium(1,4-dibenzyl-1,3-butadiene)cyclohexyl; pentadienyltitanium(1,3-isoprene)trimethylsilyl; pentadienyltitanium(2,4-hexadiene)trimethylsilylmethyl; pentadienyltitanium(3-methyl-1,3-pentadiene)benzyl; pentadienyltitanium(1,4-ditolyl-1,3butadiene)phenyl; pentadienyltitanium(1,4-bis(trimethylsilyl)-1,3-butadiene)t-butyl; pentadienyltitanium(1,3-butadiene)t-butyl; pentadienyltitanium(1,3-butadiene)allyl;

B6) 2,4-dimethylpentadienyl complexes including: 2,4-dimethylpentadienyltitanium(1,4-diphenyl-1,3-butadiene)methyl; 2,4-dimethylpentadienyltitanium(1,4-dibenzyl-1,3butadiene)cyclohexyl; 2,4-dimethylpentadienyltitanium(2,4hexadiene)trimethylsilylmethyl; 2,4-dimethylpentadienyltitanium(3-methyl-1,3-pentadiene)benzyl; 2,4-dimethylpentadienyltitanium(1,4-ditolyl-1,3butadiene)phenyl; 2,4-dimethylpentadienyltitanium(1,4-bis(trimethylsilyl)- 1,3-butadiene)t-butyl;

B7) 6,6-dimethylcyclohexadienyl complexes including: 6,6-dimethylcyclohexadienyltitanium(1,4-diphenyl1,3-butadiene)methyl; 6,6-dimethylcyclohexadienyltitanium(1,4-dibenzyl-1,3-butadiene)cyclohexyl; 6,6-dimethylcyclohexadienyltitanium(2,4-hexadiene)trimethylsilylmethyl; 6,6-dimethylcyclohexadienyltitanium(3-methyl-1,3pentadiene)benzyl; 6,6-dimethylcyclohexadienyltitanium(1,4-ditolyl-1,3-butadiene)phenyl; 6,6-dimethylcyclohexadienyltitanium(1,4-bis(trimethylsilyl)- 1,3-butadiene)t-butyl; 6,6-dimethylcyclohexadienyltitanium(2,3-dimethyl1,3-butadiene)1-methylallyl;

B8) 3-methylpentadienyl complexes including: 3-methylpentadienyltitanium(1,4-diphenyl-1,3-butadiene)methyl; 3-methylpentadienyltitanium(1,4-dibenzyl-1,3-butadiene)cyclohexyl; 3-methylpentadienyltitanium(2,4-hexadiene)trimethylsilylmethyl; 3-methylpentadienyltitanium(3-methyl-1,3-pentadiene)benzyl; 3-methylpentadienyltitanium(1,4-ditolyl-1,3butadiene)phenyl; 3-methylpentadienyltitanium(1,4-bis(trimethylsilyl)-1,3-butadiene )t-butyl; 3-methylpentadienyltitanium(1,3-butadiene allyl;

c) hydrocarbyloxy complexes

C1) cyclopentadienyl complexes including: cyclopentadienyl titanium(1,4-diphenyl-1,3butadiene)methoxide; cyclopentadienyltitanium(1,4-dibenzyl- 1,3-butadiene)t-butoxide; cyclopentadienyltitanium(2,4-hexadiene)isopropoxide; cyclopentadienyltitanium(3-methyl-1,3-pentadiene)methoxide;cyclopentadienyltitanium(1,4-ditolyl-1,3-butadiene)phenoxide; cyclopentadienyltitanium(1,4-bis(trimethylsilyl)1,3-butadiene)phenoxide;

C2) pentamethylcyclopentadienyl complexes including: pentamethylcyclopentadienyltitanium(1,4-diphenyl-1,3-butadiene)methoxide; pentamethylcyclopentadienyltitanium(1,4-diphenyl-1,3-butadiene)isopropoxide; pentamethylcyclopentadienyltitanium(1,4-diphenyl-1,3-butadiene)t-butoxide; pentamethylcyclopentadienyltitanium(1,4-diphenyl-1,3-butadiene)phenoxide; pentamethylcyclopentadienyltitanium(1,4-dibenzyl-1,3-butadiene)t-butoxide; pentamethylcyclopentadienyltitanium(2,4hexadiene)isopropoxide; pentamethylcyclopentadienyltitanium(3-methyl-1,3-pentadiene)t-butoxide; pentamethylcyclopentadienyltitanium(1,4-ditolyl-1, 3-butadiene)phenoxide; pentamethylcyclopentadienyltitanium(1,4-bis(trimethylsilyl)-1,3butadiene)phenoxide;

C3) t-butylcyclopentadienyl complexes including: t-butylcyclopentadienyl titanium(1,4-diphenyl-1,3-butadiene)methoxide; t-butylcyclopentadienyltitanium (1,4,dibenzyl-1,3-butadiene)t-butoxide; t-butylcyclopentadienyltitanium(2,4-hexadiene)isopropoxide; t-butylcyclopentadienyltitanium(3-methyl- 1,3-pentadiene)t-butoxide; t-butylcyclopentadienyltitanium(1,4-ditolyl-1,3-butadiene)-phenoxide; t-butylcyclopentadienyltitanium(1,4-bis(trimethylsilyl)-1,3-butadiene)phenoxide;

C4) indenyl complexes including: indenyltitanium(1, 4-diphenyl-1,3-butadiene)methoxide; indenyltitanium(1,4-dibenzyl-1,3-butadiene)t-butoxide; indenyltitanium(2,4hexadiene)isopropoxide; indenyltitanium(3-methyl1,3-pentadiene)t-butoxide; indenyltitanium(1,4-ditolyl- 1,3-butadiene)phenoxide; indenyltitanium(1,4-bis(trimethylsilyl)-1,3-butadiene)phenoxide;

C5) pentadienyl complexes including: pentadienyltitanium(1,4-diphenyl-1,3-butadiene)methoxide; pentadienyltitanium(1,4-dibenzyl-1,3-butadiene)t-butoxide; pentadienyltitanium(2,4-hexadiene)isopropoxide; pentadienyltitanium(3-methyl-1,3-pentadiene)t-butoxide; pentadienyltitanium(1,4-ditolyl-1,3-butadiene)phenoxide; pentadienyltitanium(1,4-bis(trimethylsilyl))-1,3-butadiene)phenoxide;

C6) 2,4-dimethylpentadienyl complexes including: 2,4-dimethylpentadienyltitanium(1,4-diphenyl-1,3-butadiene)methoxide; 2,4-dimethylpentadienyltitanium(1,4-dibenzyl-1,3-butadiene)t-butoxide; 2,4-dimethylpentadienyltitanium(2,4-hexadiene)isopropoxide; 2,4-dimethylpentadienyltitanium(3-methyl-1,3-pentadiene)t-butoxide; 2,4-dimethylpentadienyltitanium(1,4-ditolyl-1,3-butadiene)phenoxide; 2,4-dimethylpentadienyltitanium(1,4-bis(trimethylsilyl)- 1,3-butadiene)phenoxide;

C7) 6,6-dimethylcyclohexadienyl complexes including: 6,6-dimethylcyclohexadienyltitanium(1,4-diphenyl-1,3-butadiene)methoxide; 6,6-dimethylcyclohexadienyltitanium(1,4-dibenzyl-1,3-butadiene)t-butoxide; 6,6-dimethylcyclohexadienyltitanium(2,4-hexadiene)isopropoxide; 6,6-dimethylcyclohexadienyltitanium(3-methyl-1,3-pentadiene)t-butoxide; 6,6-dimethylcyclohexadienyltitanium(1,4-ditolyl-1,3-butadiene)phenoxide; 6,6-dimethylcyclohexadienyltitanium(1,4-bis(trimethylsilyl)- 1,3-butadiene)phenoxide;

C8) 3-methylpentadienyl complexes including: 3-methylpentadienyltitanium(1,4-diphenyl-1,3butadiene)methoxide; 3-methylpentadienyltitanium(1,4-dibenzyl-1,3-butadiene)t-butoxide; 3-methylpentadienyltitanium(2,4-hexadiene)isopropoxide; 3-methylpentadienyltitanium(3-methyl-1,3-pentadiene)t-butoxide; 3-methylpentadienyltitanium(1,4-ditolyl-1,3butadiene)phenoxide; and 3-methylpentadienyltitanium(1,4-bis(trimethylsilyl)- 1,3-butadiene)phenoxide.

The foregoing complexes may exist in either the +2 or +4 formal oxidation state. Additional complexes especially the corresponding zirconium or hafnium containing derivatives will be readily apparent to the skilled artisan, as well as complexes that are variously substituted as herein defined.

In general, the complexes can be prepared by combining the free, uncoordinated, diene compound, metal precursor compound and optional reducing agent, as previously described, in a suitable noninterfering solvent at a temperature from −100° C. to 300° C., preferably from −78° to 120° C., most preferably from 0 to 80° C. By the term "reducing agent" herein is meant a metal or compound which, under reducing conditions causes the metal to be reduced from the +4 or +3 formal oxidation state to the +2 formal oxidation state. Examples of suitable metal reducing agents are alkali metals, alkaline earth metals, aluminum, and zinc, alloys of alkali metals or alkaline earth metals such as sodium/mercury amalgam and sodium/potassium alloy. Examples of suitable reducing agent compounds are sodium naphthalenide, potassium graphite, lithium alkyls, lithium or potassium alkadienyls; and Grignard reagents. Most preferred reducing agents are the alkali metals or alkaline earth metals, especially lithium and magnesium metal, and lithium $C_{1-6}$ alkyls, especially butyllithium.

Highly preferred diene compounds are those formed from the dienes: 1,4-diphenyl-1,3-butadiene; 3-methyl- 1,3-pentadiene; 1,4-dibenzyl-1,3-butadiene; 2,4- hexadiene; 1,4-ditolyl-1,3-butadiene; and 1,4-bis-(trimethylsilyl)-1,3-butadiene, isoprene, butadiene, 2,3-dimethylbutadiene and 1,3-pentadiene.

Suitable reaction media for the formation of the complexes are aliphatic and aromatic hydrocarbons and halohydrocarbons, ethers, and cyclic ethers. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, xylene, styrene and the like, $C_{1-4}$ dialkyl ethers, $C_{1-4}$ dialkyl ether derivatives of (poly)alkylene glycols, and tetrahydrofuran. Mixtures of the foregoing are also suitable.

The recovery procedure involves separation of the resulting alkali metal or alkaline earth metal salt and devolatilization of the reaction medium. Extraction into a secondary solvent may be employed if desired. Alternatively, if the desired product is an insoluble precipitate, filtration or other separation technique may be employed.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or diisobutylalumoxane; strong Lewis acids, such as $C_{1-30}$ hydrocarbyl substituted Group 13 compounds, especially tri(hydrocarbyl)aluminum- or tri(hydrocarbyl)boron-compounds and halogenated derivatives thereof, having from 1 to 10 carbons in each hydrocarbyl or halogenated hydrocarbyl group, especially tris(pentafluorophenyl)borane; and nonpolymeric, compatible, noncoordinating, ion forming compounds (including the use of such compounds under oxidizing conditions). A suitable activating technique is_bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277, 003, U.S. Pat. Nos. 5,153,157, 5,064,802, EP-A-468,651

(equivalent to U.S. Ser. No. 07/547,718), EP-A-520,732 (equivalent to U.S. Ser. No. 07/876,268), and WO19323412 (equivalent to U.S. Ser. Nos. 07/884,966 filed May 1, 1992), the teachings of which are hereby incorporated by reference.

Suitable nonpolymeric compatible, noncoordinating, ion forming compounds useful as cocatalysts in one embodiment of the present invention comprise a cation which is a Bronsted acid capable of donating a proton, and a compatible noncoordinating, anion, A–. Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

$$(L^*-H)^+_f (A^{f-})$$

wherein:

L* is a neutral Lewis base;

$(L^*-H)^+$ is a Bronsted acid;

$A^{f-}$ is a noncoordinating, compatible anion having a charge of f–, and f is an integer from 1 to 3.

More preferably d is one, ie. $A^{f-}$ is A–. Highly preferably, A– corresponds to the formula: $[BQ_4]^-$ wherein, B is boron in the +3 formal oxidation state; and Q independently each occurrence is selected from hydride, dialkylamido, halide, alkoxide aryloxide hydrocarbyl, halocarbyl, and halosubstituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most highly preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are trisubstituted ammonium salts such as: triethylammonium tetraphenylborate, tetraphenylborate, tripropylammonium tetraphenylborate, tri(n-butyl)ammonium tetraphenylborate, tri(t-butyl )ammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, triethylammonium tetrakis(pentafluorophenyl)borate tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenulborate, triethylammonium tetrakis(2,3,4,6-tetrafluorophenyl)borate, tripropylammonium tetrakis(2,3,4,6-tetrafluorophenyl)borate, tri(n-butyl)ammonium tetrakis( 2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate and N,N-dimethyl-(2,4,6-trimethylanilinium)tetrakis((2,3,4,6-tetrafluorophenyl)borate; dialkyl ammonium salts such as: di-(i-propyl)ammonium tetrakis(pentafluorophenyl)borate, and dicyclohexylammonium tetrakis(pentafluorophenyl)borate; and tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis (pentafluorophenyl)borate.

Preferred are N,N-dimethylanilinium tetrakis(pentafluorophenyl)borate and tributylammonium tetrakis(pentafluorophenyl)borate.

Another suitable nonpolymeric, compatible, noncoordinating, ion forming, activating cocatalyst comprises a salt of a cationic oxidizing agent and a noncoordinating, compatible anion represented by the formula:

$$(Ox^{e+})_d(A^{f-})_e$$

wherein:

$Ox^{e+}$ is a cationic oxidizing agent having a charge of e+;

e is an integer from 1 to 3; and $A^{f-}$, and f are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$©+A-$$

wherein:

©+ is a $C_{1-20}$ carbenium ion and

A– is as previously defined. A preferred carbenium ion is the trityl cation, i.e. triphenylcarbenium.

The foregoing activating technique and ion forming cocatalysts are also preferably used in combination with a tri(hydrocarbyl)aluminum compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

An especially preferred activating cocatalyst comprises the combination of a trialkyl aluminum compound having from 1 to 4 carbons in each alkyl group and an ammonium salt of tetrakis(pentafluorophenyl)borate, in a molar ratio from 0.1:1 to 1:0.1, optionally up to 1000 mole percent (with respect to M) of an alkylaluminoxane may also be present in the mixture.

The activating technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly suitable solvents are materials that are: liquids under the conditions of the electrolysis (generally temperatures from 0° to 100° C.), capable of dissolving the supporting electrolyte and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), DME, and mixtures thereof.

The electrolysis may be conducted in a standard electrolytic cell containing an anode and cathode (also referred to as the working electrode and counter electrode respectively). Suitably materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, $A^-$. Preferred supporting electrolytes are salts corresponding to the formula $G^+A^-$; wherein:

$G^+$ is a cation which is nonreactive towards the starting and resulting complex, and $A^-$ is a noncoordinating, compatible anion.

Examples of cations $G^+$, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoro-aryl) borates having from 1 to 10 carbons in each hydrocarbyl group, especially tetra-n-butylammonium tetrakis(pentafluorophenyl) borate.

The molar ratio of catalyst/cocatalyst employed preferably ranges from 1:10,000 to 100:1, more preferably from 1:5000 to 10:1, most preferably from 1:10 to 1:1.

The catalysts may be used to polymerize ethylenically and/or acetylenically unsaturated monomers having from 2 to 20 carbon atoms either alone or in combination. Preferred monomers include the $C_{2-10}$ α-olefins especially ethylene, propylene, isobutylene, 1-butene, 1-hexene, 3-methyl-1-pentene, 4-methyl-1-pentene, and 1-octene and mixtures thereof. Other preferred monomers include vinylidene aromatic monomers, especially styrene, $C_{1-4}$ alkyl substituted styrene, α-methylstyrene and mixtures thereof; tetrafluoroethylene vinylbenzocyclobutane; ethylidenenorbornene 4-vinylcyclohexene; vinylcyclohexane; divinylbenzene, and 1,4-hexadiene. Mixtures of the foregoing monomers may also be polymerized.

In general, the polymerization may be accomplished at conditions well known in the prior art for Ziegler-Natta or Kaminsky-Sinn type polymerization reactions, i.e., temperatures from 0°–250° C. and pressures from atmospheric to 10000 atmospheres. Suspension, solution, slurry, gas phase or other process conditions may be employed if desired. A support, especially silica alumina, or a polymer (especially polytetrafluoroethylene or a polyolefin) may be employed, and desirably is employed when the catalysts are used in a gas phase or slurry polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizable compounds employed is from $10^{-12}$:1 to $10^{-1}$:1, more preferably from $10^{-12}$:1 to $10^{-5}$:1.

Suitable solvents for polymerization are inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane and mixtures thereof; perfluorinated hydrocarbons such as perfluorinated $C_{4-10}$ alkanes, and the like and aromatic and alkyl-substituted aromatic compounds such as benzene toluene, and xylene. Suitable solvents also include liquid olefins which may act as monomers or comonomers including ethylene, propylene, butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable.

When the present polymerization catalysts are used to polymerize prochiral olefins, especially monovinylidene aromatic monomers, syndiotactic or isotactic polymers are attainable. As used herein, the term "syndiotactic" refers to polymers having a stereoregular structure of greater than 50 percent, preferably greater than 75 percent syndiotactic of a racemic triad as determined by $^{13}C$ nuclear magnetic resonance spectroscopy. Conversely, the term "isotactic" refers to polymers having a stereoregular structure of greater than 50 percent, preferably greater than 75 percent isotactic of a meso triad as determined by $^{13}C$ nuclear magnetic resonance spectroscopy. Such polymers may be usefully employed in the preparation of articles and objects having an extremely high resistance to deformation due to the effects of temperature via compression molding, injection molding or other suitable technique.

The catalysts may also be utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. Ser. No. 07/904,770, as well as U.S. Ser. No. 08/10958, filed Jan. 29, 1993, the teachings of which are hereby incorporated by reference herein.

One such solution phase polymerization process comprises:

contacting in a solvent one or more α-olefins with a composition according to the present invention in one or more continuous stirred tank or tubular reactors connected in series or parallel, and recovering the resulting polymer.

In another such solution phase polymerization process, in one or more of the foregoing reactors one or more α-olefins are also contacted with a catalyst composition according to the present invention in admixture with one or more homogeneous metallocene complexes other than those employed in the compositions according to the present invention.

In yet another solution process an ethylene/α-olefin interpolymer composition is prepared by:

(A) contacting ethylene and at least one other α-olefin under solution polymerization conditions in the presence of a homogeneous catalyst composition comprising a composition of the present invention in at least one reactor to produce a solution of a first interpolymer, (B) contacting ethylene and at least one other α-olefin under solution polymerization conditions and at a higher polymerization reaction temperature than used in step (A) in the presence of a heterogeneous Ziegler catalyst in at least one other reactor to produce a solution of a second interpolymer, and (C) combining the solution of the first interpolymer with the solution of the second interpolymer to form a solution comprising the ethylene/α-olefin interpolymer composition, and (D) recovering the ethylene/α-olefin interpolymer composition.

Preferably the heterogeneous Ziegler catalyst comprises:

(i) a solid support component comprising magnesium halide, silica, modified silica, alumina, aluminum phosphate, or a mixture thereof, and (ii) a transition metal component represented by the formula:

$$TrX''_u(OR^1)_{v-u}, TrX''_uR^1_{v-u}, VOX''_3 \text{ or } VO(OR^1)_3,$$

wherein:

Tr is a Group 4, 5, or 6 metal, u is a number from 0 to 6 that is less than or equal to v, v is the formal oxidation number of Tr, X" is a halogen, $R^1$ independently each occurrence is a hydrocarbyl group having from 1 to 20 carbon atoms.

These polymerizations are generally carried out under solution conditions to facilitate the intimate mixing of the two polymer-containing streams. The foregoing technique allows for the preparation of ethylene/α-olefin interpolymer compositions having a broad range of molecular weight distribution and composition distribution. Preferably, the heterogeneous catalyst is also chosen from those catalysts which are capable of efficiently producing the polymers under high temperature, especially temperatures greater than or equal to 180° C. under solution process conditions.

In a still further embodiment, there is provided a process for preparing an ethylene/α-olefin interpolymer composition, comprising:

(A) polymerizing ethylene and at least one other α-olefin in a solution process under suitable solution polymerization temperatures and pressures in at least one reactor containing a catalyst composition comprising the composition of the present invention to produce a first interpolymer solution, (B) passing the interpolymer solution of (A) into at least one other reactor containing a heterogeneous Ziegler catalyst in the presence of ethylene and optionally one other α-olefin under solution polymerization conditions to form a solution comprising the ethylene/α-olefin interpolymer composition, and (C) recovering the ethylene/α-olefin interpolymer composition.

Preferably the heterogeneous Ziegler catalyst comprises:

(i) a solid support component comprising a magnesium halide or silica, and (ii) a transition metal component represented by the formula:

$$TrX''_u(OR^1)_{v-u}, TrX''_uR^1_{v-u}, VOX''_3 \text{ or } VO(OR^1)_3.$$

wherein:

Tr, X"u, v, and $R^1$ are as previously defined.

The foregoing technique also allows for the preparation of ethylene/a-olefin interpolymer compositions having a broad range of molecular weight distributions and composition distributions. Particularly desirable α-olefins for use in the foregoing processes are $C_{4-8}$ α-olefins, most desirably 1-octene.

The skilled artisan will appreciate that the invention disclosed herein may be practiced in the absence of any component which has not been specifically disclosed. The following examples are provided as further illustration thereof and are not to be construed as limiting. Unless stated to the contrary all parts and percentages are expressed on a weight basis.

EXAMPLE 1

Pentamethylcyclopentadienyltitanium s-cis-$\eta^4$-1,4-diphenyl- 1,3-butadiene t-butoxide Preparation In an inert atmosphere glove box, 0.53 g (0.0019 mol) of pentamethylcyclopentadienyltitanium trichloride ($C_5Me_5$)$TiCl_3$ is dissolved into 50 mL of tetrahydrofuran (THF) and cooled to 0° C. To this solution is added dropwise 0.18 g (0.0019 mol) of sodium t-butoxide in 20 ml THF after which the solution is allowed to stir for 6 hours. After the reaction period the volatiles were removed and the residue extracted with toluene resulting in the isolation of pentamethylcyclopentadienyltitanium t-butoxy dichloride, ($C_5Me_5$)Ti(OCMe$_3$)Cl$_2$, as an orange brown solid (0.54 g, 90 percent yield). 0.37 g (0.0012 mol) of this product and 0.60 g, 0.0013 mol) of (1,4-diphenyl-2-butene-1,4-diyl)Mg● 3THF were mixed together as solids and toluene (75 ml) was vacuum transferred at −78° C. to the mixture. The mixture was allowed to stir at about 25° C. for about 16 hours. The reaction mixture was filtered, and the volatile components removed under reduced pressure resulting in the isolation of a purple residue. This residue was dissolved in hexane, cooled to −78° C. and filtered. Removal of the volatile component from the filtrate resulted in the isolation of pentamethylcyclopentadienyltitanium s-cis-4-$\eta^4$-1,4-diphenyl-1,3-butadiene t-butoxide as a purple solid. Yield was 0.090 g, 17 percent.

The structure of the resulting solid was identified by 1H and 13C NMR spectral analysisto be pentamethylcyclopentadienyltitanium s-cis-$\eta^4$-1,4-trans,trans-diphenyl-1,3-butadiene t-butoxide having the formula:

Polymerization

A) The foregoing complex, pentamethylcyclopentadienyltitanium s-cis-$\eta^4$-1,4-diphenyl-1,3-butadiene t-butoxide, in a 0.03M solution in toluene was used to polymerize styrene monomer in glass flasks at 70° C. for one hour (two hours for run 4) using various cocatalysts. Run conditions were as follows:

Run 1 styrene (10 mL), methylalumoxane (MAO 2.0M in toluene), triisobutylaluminum ITIBA, 1.0M in toluene)

catalyst (0.03M in toluene)

The reactants were combined in the above order in the polymerization vial.

Run 2 styrene (10 mL), methylalumoxane (MAO, 2.0M in toluene), catalyst (0.03M in toluene)

The reactants were combined in the above order in the polymerization vial.

Run 3 styrene (10 mL), methylalumoxane (MAO, 2.0M in toluene), triisobutylaluminum (TIBA, 1.0M in toluene)

catalyst (0.003M in toluene)

MAO, TIBA and catalyst were combined for one hour at 25° C. prior to combination with styrene in the polymerization vial.

Run 4 styrene (10 mL), methylalumoxane (MAO, 2.0M in toluene), dimethylanilinium tetrakisperfluorophenyl borate (DMATB)

catalyst (0.003M in toluene)

Solid DMATB (wet with toluene), TIBA solution and catalyst solution were combined and diluted with toluene to give 10 mL total. The resulting solution was added to the styrene in the polymerization vial.

Results are contained in Table I.

TABLE I

| Run | Cocatalyst(I) | Cocatalyst(II) | Molar ratio Styrene/ Cocatalyst (I)/ Cocatalyst (II)/ catalyst | Yield (percent) |
|---|---|---|---|---|
| 1 | MAO | TIBA | 233,000/200/200/1 | 0.25 |
| 2 | " | — | 233,000/200/0/1 | 17.4 |
| 3 | " | TIBA | 233,000/200/200/1 | 25.0 |
| 4 | DMATB | " | 200,000/1/30/1 | 18.5 |

The resulting polymer possessed a crystalline melting point of 259° C., indicating that the polymer was syndiotactic.

EXAMPLE 2

Pentamethylcyclopentadienyltitanium ($\eta^{3-1}$-methallyl) ($\eta^4$-butadiene)

Preparation

In an inert atmosphere glove box, 2.20 g (0.0076 moles) of pentamethylcyclopentadienyltitanium trichloride (CMe$_5$)TiCl$_3$ was stirred in 150 ml of diethyl ether at 0° C. while 2-butenylmagnesium chloride (0.0228 moles, 33.0 mL of a 0.69M solution in diethyl ether) was added dropwise over 20 minutes. The mixture was allowed to stir for 3 hours at 25° C. After this reaction period the volatiles were removed and the residue extracted with hexane. Recrystallization at −78° C. resulting in the isolation of pentamethylcyclopentadienyltitanium ($\eta^3$-1-methallyl)($\eta^4$-butadiene), as a brown solid (0.59 g, 25 percent yield).

The structure of the resulting complex is as follows:

Polymerization

A) The polymerization conditions of Example 1 were substantially repeated using as a catalyst the complex, pentamethylcyclopentadienyltitanium ($\eta^3$-1-methallyl) ($\eta^4$-butadiene). Results are contained in Table II.

TABLE II

| Run | Cocatalyst(I) | Cocatalyst(II) | Molar ratio Styrene/ Cocatalyst (I)/ Cocatalyst (II)/ catalyst | Yield (percent) |
|---|---|---|---|---|
| 1 | MAO | TIBA | 233,000/200/200/1 | 15.7 |
| 2 | " | — | 233,000/200/0/1 | 10.9 |
| 3 | " | TIBA | 233,000/200/200/1 | 3.7 |
| 4 | DMATB | " | 200,000/1/30/1 | 5.0 |

The resulting polymer possessed a crystalline melting point of 272° C., indicating it was syndiotactic.

EXAMPLE 3

Pentamethylcyclopentadienylzirconium ($\eta^3$-1-methallyl)-($\eta^4$-butadiene)

Preparation

In an inert atmosphere glove box, 2.09 g (0.0063 moles) of pentamethylcyclopentadienylzirconium trichloride (C$_5$Me$_5$)ZrCl$_3$ was stirred in 150 mL of diethyl ether at 0° C. while 2-butenylmagnesium chloride (0.0188 moles, 27.3 mL of a 0.69M solution in diethyl ether) was added dropwise over 30 minutes. The mixture was allowed to stir for 3 hours at 25° C. After this reaction period the volatiles were removed and the residue extracted with hexane at −78° C. resulting in the isolation of pentamethylcyclopentadienylzirconium ($\eta^3$-1-methallyl) ($\eta^4$-butadiene), as a red solid (1.58 g, 75 percent yield).

The structure of the resulting complex is as follows:

Polymerization

A) The polymerization conditions of Example 1 were substantially repeated using as a catlayst the complex, pentamethylcyclopentadienylzirconium ($\eta^3$-1-methallyl)($\eta^4$-butadiene). Results are contained in Table III.

TABLE III

| Run | Cocatalyst(I) | Cocatalyst(II) | Molar ratio Styrene/ Cocatalyst (I)/ Cocatalyst (II)/ catalyst | Yield (percent) |
|---|---|---|---|---|
| 1 | MAO | TIBA | 233,000/200/200/1 | 0.29 |
| 2 | " | — | 233,000/200/0/1 | 0.34 |
| 3 | " | TIBA | 233,000/200/200/1 | 0.40 |
| 4 | DMATB | " | 200,000/1/30/1 | 0.30 |

The resulting polymers possessed crystalline melting points in excess of 260° C., indicating that the polymers were syndiotactic.

EXAMPLE 4

Pentamethylcyclopentadienylhafnium ($\eta^3$-1-methallyl) ($\eta^4$-butadiene)

Preparation

In an inert atmosphere glove box, 1.93 g (0.0046 moles) of pentamethylcyclopentadienylhafnium trichloride (C$_5$Me$_5$)ZrCl$_3$ was stirred in 150 ml of diethyl ether at 0° C. while 2-butenylmagnesium chloride (0.0138 moles, 20.0 mL of a 0.69M solution in diethyl ether) was added dropwise over 30 minutes. The mixture was allowed to stir for 3 hours at 25° C. After this reaction period the volatiles were removed and the residue extracted with hexane, resulting in the isolation of a yellow oil. The product was dissolved in 50 mL of THF and refluxed for 8 hours. The volatiles were again removed and pentamethylcyclopentadienyl hafnium ($\eta^3$-1-methallyl)($\eta^4$-butadiene), was recovered by hexane recrystallization at −78° C. as a yellow solid. Yield was 0.43 g, 22 percent.

The structure of the resulting complex is as follows:

Polymerization

A) The polymerization conditions of Example 1 were substantially repeated using as a catlayst the complex, pentamethylcyclopentadienyl hafnium ($\eta^3$-1-methallyl)(4butadiene). Results are contained in Table IV.

TABLE IV

| Run | Cocatalyst(I) | Cocatalyst(II) | Molar ratio Styrene/ Cocatalyst (I)/ Cocatalyst (II)/ catalyst | Yield (percent) |
|---|---|---|---|---|
| 1 | MAO | TIBA | 233,000/200/200/1 | 0.46 |
| 2 | " | — | 233,000/200/0/1 | 0.36 |
| 3 | " | TIBA | 233,000/200/200/1 | 0.10 |
| 4 | DMATB | " | 200,000/1/30/1 | 0.70 |

The resulting polymer possessed a crystalline melting point of 201° C. indicating that it was tactic

EXAMPLE 5

Pentamethylcyclopentadienyltitanium s-cis-$\eta^4$-1,4-diphenyl-1,3-butadiene chloride Preparation In an inert atmosphere glove box, 0.0398 g (0.00575 mole) of lithium and 0.395 g, (0.00190 moles) of 1,4-diphenylbutadiene were stirred in THF (50 mL) for three hours and the resulting purple solution filtered. This solution was then added dropwise to a solution of pentamethylcyclopentadienyltitanium trichloride (0.526 g, 0.00182 moles) in THF (25 mL) at 0° C. The resulting mixture was allowed to stir at 25° C. for 2 hours. After the reaction period the volatiles were removed, the residue was extracted with hexane and filtered resulting in the isolation of solid pentamethylcyclopentadienyltitanium s-cis-$\eta$4-1,4-diphenyl-1,3-butadiene chloride, (0.30 g, 39 percent yield).

The structure of the resulting complex is identified as follows:

Polymerization

A) The polymerization conditions of Example 1 were substantially repeated excepting that the catalysts was Pentamethylcyclopentadienyltitanium s-cis-$\eta^4$-1,4-diphenyl-1,3-butadiene chloride. Results are contained in Table V.

EXAMPLE 6

Pentamethylcyclopentadienyltitanium $\eta$4-1,4-diphenyl-1,3-butadiene dimethylamide Preparation In an inert atmosphere glove box, 3.87 g (0.0134 mole) of pentamethylcyclopentadienyltitanium trichloride was stirred in THF (50 mL) as a solution of lithium dimethylamide (0.751 g, 0.0147 moles in THF (25

TABLE V

| Run | Cocatalyst(I) | Cocatalyst(II) | Molar ratio Styrene/ Cocatalyst (I)/ Cocatalyst (II)/ catalyst | Yield (percent) |
| --- | --- | --- | --- | --- |
| 1 | MAO | TIBA | 233,000/200/200/1 | 15.48 |
| 2 | " | — | 233,000/200/0/1 | 9.36 |
| 3 | " | TIBA | 233,000/200/200/1 | 12.57 |
| 4 | DMATB | " | 200,000/1/30/1 | 1.89 | mL)) was added dropwise at 0° C. The resulting mixture was allowed to stir at 25° C. for about 16 hours. After this reaction period the volatiles were removed, the residue was washed once with hexane and then extracted with toluene and filtered. The product, pentamethylcyclopentadienyltitanium dimethylamide dichloride was recrystallized from toluene at −78° C. Yield was 2.25 g, 58 percent.

1,4-diphenylbutadiene, (0.290 g, 0.00133 moles) and lithium (0.0292 g, 0.00421 moles) were stirred in THF (30 mL) for 3 hours after which time the purple solution was filtered. This solution was then added dropwise to a solution of 0.385 g (0.00133 mol) of pentamethylcyclopentadienyltitanium dimethylamide dichloride in THF (30 mL) at 0° C. The mixture was allowed to stir at 25° C. for about 16 hours. The volatile components were removed under reduced pressure and the residue extracted with hexane and filtered. Removal of the volatile component from the filtrate resulted in the isolation of pentamethylcyclopentadienyltitanium s-cis-$\eta^4$-1,4-diphenyl-1,3-butadiene dimethylamide as a dark solid. Yield was 0.30 g, 52 percent.

The structure of the resulting complex is identified as follows:

Polymerization

A) The polymerization conditions of Example 1 were substantially repeated excepting that the catalysts was Pentamethylcyclopentadienyltitanium 1,4-diphenyl-1,3-butadiene dimethylamide. Results are contained in Table VI.

TABLE VI

| Run | Cocatalyst(I) | Cocatalyst(II) | Molar ratio Styrene/ Cocatalyst (I)/ Cocatalyst (II)/ catalyst | Yield (percent) |
| --- | --- | --- | --- | --- |
| 1 | MAO | TIBA | 233,000/200/200/1 | 17.28 |
| 2 | " | — | 233,000/200/0/1 | 11.12 |
| 3 | " | TIBA | 233,000/200/200/1 | 11.90 |
| 4 | DMATB | " | 200,000/1/30/1 | 16.68 |

The resulting polymer possessed a crystalline melting point of 267° C. indicating it was syndiotactic

EXAMPLE 7

Pentamethylcyclopentadienyl titanium 1,4-diphenyl-1,3-butadiene phenoxide

Preparation

In an inert atmosphere glove box, 0.4235 g (0.00122 mole) of pentamethylcyclopentadienyltitanium phenoxy dichloride and 0.2516 g (0.00122 mole) of 1,4-diphenylbutadiene were stirred in hexane (50 mL) as n-butyl lithium (0.00244 moles, 0.98 mL of a 2.5M solution in hexane) was added dropwise at 25° C. The reaction mixture was refluxed for about 2 hours. After this reaction period the mixture was filtered and the solvent removed, resulting in the isolation of a blue-green solid. The product, pentamethylcyclopentadienyltitanium 1,4-diphenyl-1,3-butadiene phenoxide was recovered as blue-green microcrystals by recrystallization from hexane at −78° C. Yield was 0.32 g, 55 percent.

The structure of the resulting complex is identified as follows:

Polymerization

A) The polymerization conditions of Example 1 were substantially repeated excepting that the catalysts was Pentamethylcyclopentadienyltitanium 1,4-diphenyl-1,3-butadiene phenoxide. Results are contained in Table VII.

TABLE VII

| Run | Cocatalyst(I) | Cocatalyst(II) | Molar ratio Styrene/ Cocatalyst (I)/ Cocatalyst (II)/ catalyst | Yield (percent) |
| --- | --- | --- | --- | --- |
| 1 | MAO | TIBA | 233,000/200/200/1 | 27.07 |
| 2 | " | — | 233,000/200/0/1 | 21.61 |
| 3 | " | TIBA | 233,000/200/200/1 | 23.82 |
| 4 | DMATB | " | 200,000/1/30/1 | 22.81 |

The resulting polymer possessed a crystalline melting point of 273° C., indicating it was syndiotactic.

EXAMPLE 8

Pentamethylcyclopentadienyltitanium s-cis-$\eta^4$-1,4-diphenyl-1,3-butadiene isopropoxide Preparation In an inert atmosphere glove box, 0.194 g (0.00062 mole) of pentamethylcyclopentadienyltitanium isopropoxy dichloride and 0.128 g (0.00062 mole) of 1,4-diphenylbutadiene were stirred in hexane (50 mL) as n-butyl lithium (0.00124 moles, 0.50 mL of a 2.48M solution in hexane) was added dropwise at 25° C. The reaction mixture was refluxed for about 2 hours. After this reaction period the mixture was filtered and the solvent removed, resulting in the isolation of a purple solid. The product, pentamethylcyclopentadienyltitanium s-cis-$\eta^4$-1,4-diphenyl-1,3-butadiene isopropoxide was recovered as a solid by recrystallization from hexane at −78° C.

Figure 1:
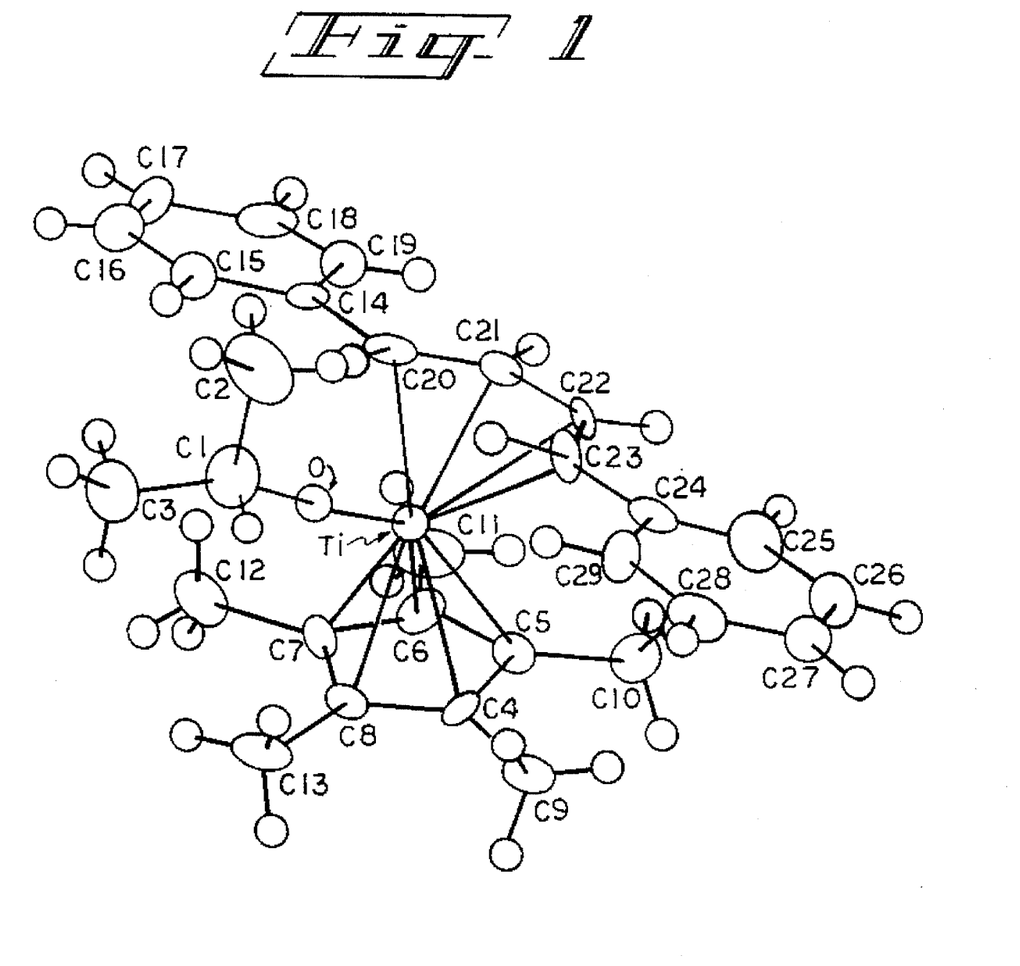
FIG. 1 is an X-ray cyrstal structure of the complex of Example 8.

The structure of the resulting complex, confirmed by $^1$H NMR analysis, is identified as follows:

having a Δd of −0.08 Å. The X-ray crystallographic structure is shown in FIG. 1.

Polymerization

A) The polymerization conditions of Example 1 were substantially repeated excepting that the catalysts was Pentamethylcyclopentadienyltitanium s-trans-$\eta^4$-1,4-diphenyl-1,3-butadiene isopropoxide. Results are contained in Table VIII.

TABLE VIII

| Run | Cocat-alyst(I) | Cocat-alyst(II) | Molar ratio Styrene/ Cocatalyst (I)/ Cocatalyst (II)/ catalyst | Yield (percent) |
| --- | --- | --- | --- | --- |
| 1 | MAO | TIBA | 233,000/200/200/1 | 22 |
| 2 | " | — | 233,000/200/0/1 | 21 |
| 3 | " | TIBA | 233,000/200/200/1 | 27 |
| 4 | DMATB | " | 200,000/1/30/1 | 38 |

The resulting polymer possessed a crystalline melting point of 269° C., indicating it was syndiotactic.

What is claimed is:

1. An addition polymerization process for preparing syndiotactic polymers comprising contacting one or more monovinylidene aromatic monomers selected from the group consisting of styrene and $C_{1-4}$ alkyl substituted styrenes with a addition polymerization catalyst corresponding to the formula:

wherein:

M is titanium in the +2 formal oxidation state;

R' in each occurrence is independently selected from the group consisting of hydrogen, alkyl, aryl, aralkyl, silyl, germyl, cyano, halo and combinations thereof said R' having up to 20 non-hydrogen atoms, or adjacent R' groups (when R' is not hydrogen, cyano or halo) together form hydrocarbylene group connected to adjacent positions of the cyclopentadienyl ring;

D is a neutral, $\eta^4$-bonded, $C_{5-30}$ diene group; and

X is chloride, allyl, methyl substituted allyl, pentadienyl and $C_{1-6}$ hydrocarbyl substituted pentadienyl.

2. A process according to claim 1 wherein D is 1,4-diphenyl-1,3-butadiene; 1,4-dibenzyl-1,3-butadiene; 2,4-hexadiene; 1,4-ditolyl-1,3-butadiene; or 1,4-bis(trimethylsilyl)-1,3-butadiene.

3. A process according to claim 1 wherein the metal complex is Pentamethylcyclopentadienyltitanium(1,4-diphenyl-1,3-butadiene)t-butoxide; pentamethylcyclopentadienyltitanium(1,4-diphenyl-1,3-butadiene)isopropoxide; pentamethylcyclopentadienyltitanium(1,4-diphenyl-1,3-butadiene)phenoxide; pentamethylcyclopentadienyltitanium($\eta^3$-1-methallyl)($\eta^4$-butadiene), or pentamethylcyclopentadienyltitanium(1,4-diphenyl-1,3-butadiene)chloride.

4. A process according to claim 1 wherein X independently each occurrence is methoxide, isopropoxide, t-butoxide, phenoxide, dimethylamide, allyl, 1-methylallyl, or pentadienyl.

5. A process according to claim 1 wherein L is selected from the group consisting of cyclopentadienyl, methylcyclopentadienyl, tetrammethylcyclopentadienyl, pentamethylcyclopentadienyl, t-butylcyclopentadienyl, indenyl, tetramethylindenyl, fluorenyl, tetrahydrofluorenyl and octahydrofluorenyl.

6. A process according to claim 1 wherein the molar ratio of catalyst:monomer is from $10^{-12}$:1 to $10^{-1}$:1.

7. A process according to claim 1 wherein the activating cocatalyst is selected from the group consisting of polymeric or oligomeric alumoxanes; hydrocarbyl substituted Group 13 compounds containing from 1 to 10 carbons in each hydrocarbyl group; halogenated trihydrocarbylboron compounds containing from 1 to 10 carbons in each halogenated hydrocarbyl group; nonpolymeric, inert, compatible, noncoordinating, ion forming compounds; and combinations thereof.

8. A process according to claim 1 wherein the activating cocatalyst is methylalumoxane, a $C_{1-30}$ trialkylaluminum compound, a $C_{1-10}$ trihydrocarbylammonium tetrakis(pentafluorophenyl)borate compound or a mixture thereof.

9. A process according to claim 1 wherein the activating cocatalyst comprises a cation which is a Bronsted acid capable of donating a proton, and a noncoordinating, compatible, inert anion.

10. A process according to claim 1 wherein the activating cocatalyst comprises a compound represented by the formula:

$$(L^*\!\!-\!\!H)^+_f (A^{f-})$$

wherein:

L* is a neutral Lewis base;

(L*—H)$^+$ is a Bronsted acid;

A$^{f-}$ is a noncoordinating, compatible anion, and f is an integer from 1 to 3.

11. A composition according to claim 9 wherein the noncoordinating, compatible anion is tetrakis(pentafluorophenyl)borate.

12. A process according to claim 1 wherein the monomer is styrene.

13. A process according to claim 1 wherein the polymer has a syndiotacticity of at least 75 percent at a racemic triad.

14. A process according to claim 1 wherein the catalyst is supported.

* * * * *

UNITED STATES PATENT AND TRADEMARK OFFICE
CERTIFICATE OF CORRECTION

PATENT NO. : 5,543,480
DATED : August 6, 1996
INVENTOR(S) : Jasson T. Patton et al.

It is certified that error appears in the above-indentified patent and that said Letters Patent is hereby corrected as shown below:

Claim 11, column 26, line 55, "composition" should correctly read --process --

Signed and Sealed this

Twenty-second Day of April, 1997

Attest:

BRUCE LEHMAN

*Commissioner of Patents and Trademarks*

*Attesting Officer*

UNITED STATES PATENT AND TRADEMARK OFFICE
CERTIFICATE OF CORRECTION

PATENT NO. : 5,543,480
DATED : August 6, 1996
INVENTOR(S) : Jasson T. Patton, Gregory F. Schmidt, David D. Devore, David R. Wilson, Francis J. Timmers, Jorge Soto It is certified that error appears in the above-indentified patent and that said Letters Patent is hereby corrected as shown below:

Column 4, line 6, first and second occurrence, "$\sigma$" should correctly read -- $\pi$ --

Column 4, line 6, "$\pi$" should correctly read -- $\sigma$ --

Signed and Sealed this

Twenty-fifth Day of November, 1997

Attest:

BRUCE LEHMAN

Attesting Officer

Commissioner of Patents and Trademarks